(12) United States Patent
Mulder

(10) Patent No.: US 7,380,806 B2
(45) Date of Patent: Jun. 3, 2008

(54) VEHICLE STEP TUBE

(75) Inventor: Craig C. Mulder, Dorr, MI (US)

(73) Assignee: Steffens Enterprises, Inc., Caledonia, MI (US)

( * ) Notice: Subject to any disclaimer, the term of this patent is extended or adjusted under 35 U.S.C. 154(b) by 0 days.

(21) Appl. No.: 11/392,891

(22) Filed: Mar. 29, 2006

(65) Prior Publication Data

US 2006/0163835 A1    Jul. 27, 2006

Related U.S. Application Data

(63) Continuation of application No. 10/855,265, filed on May 27, 2004, now Pat. No. 7,168,721.

(51) Int. Cl.
*B60R 3/00* (2006.01)

(52) U.S. Cl. .................. 280/163; 280/169; 280/762; 280/164.1; 280/166

(58) Field of Classification Search ............. 180/305, 180/252, 9.36, 307, 6.48; 280/242, 6.15, 280/163, 169, 762, 164.1, 164.2, 166
See application file for complete search history.

(56) References Cited

U.S. PATENT DOCUMENTS

| 2,084,019 | A | * | 6/1937 | Edwards | 280/163 |
| 4,011,695 | A | * | 3/1977 | Simmons, Sr. | 52/8 |
| 5,713,589 | A | * | 2/1998 | Delgado et al. | 280/163 |
| 6,050,579 | A | * | 4/2000 | Selland et al. | 280/163 |
| 6,244,734 | B1 | * | 6/2001 | Hulse | 362/495 |
| 6,513,821 | B1 | * | 2/2003 | Heil | 280/169 |
| 6,588,781 | B2 | * | 7/2003 | Pohill et al. | 280/163 |
| 6,588,782 | B2 | * | 7/2003 | Coomber et al. | 280/163 |
| 6,769,704 | B2 | * | 8/2004 | Cipolla | 280/163 |

FOREIGN PATENT DOCUMENTS

WO    WO 91/05678    *    5/1991    ................ 280/163

* cited by examiner

*Primary Examiner*—Paul N. Dickson
*Assistant Examiner*—Cynthia F. Collado
(74) *Attorney, Agent, or Firm*—Warner Norcross & Judd LLP

(57) ABSTRACT

A vehicle step tube comprising a one-piece elongated extrusion having a plurality of vertical ribs extending from the upper surface. The ribs are relatively short in a step portion of the extrusion to form a step platform. The ribs are relatively tall in the non-step portions flanking the step portion. The ribs define transverse recesses in the step portion to enhance traction and aesthetics.

5 Claims, 16 Drawing Sheets

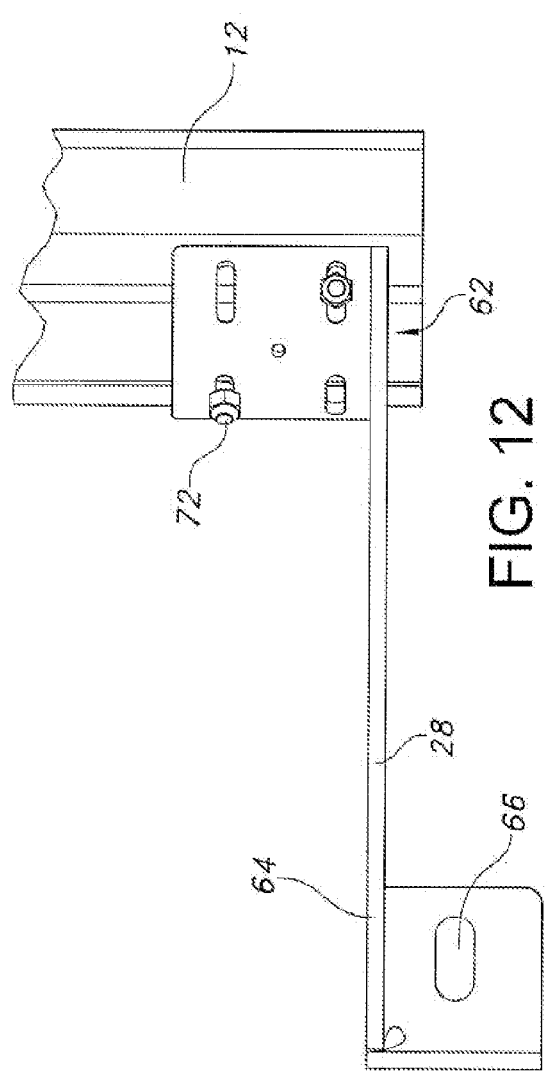
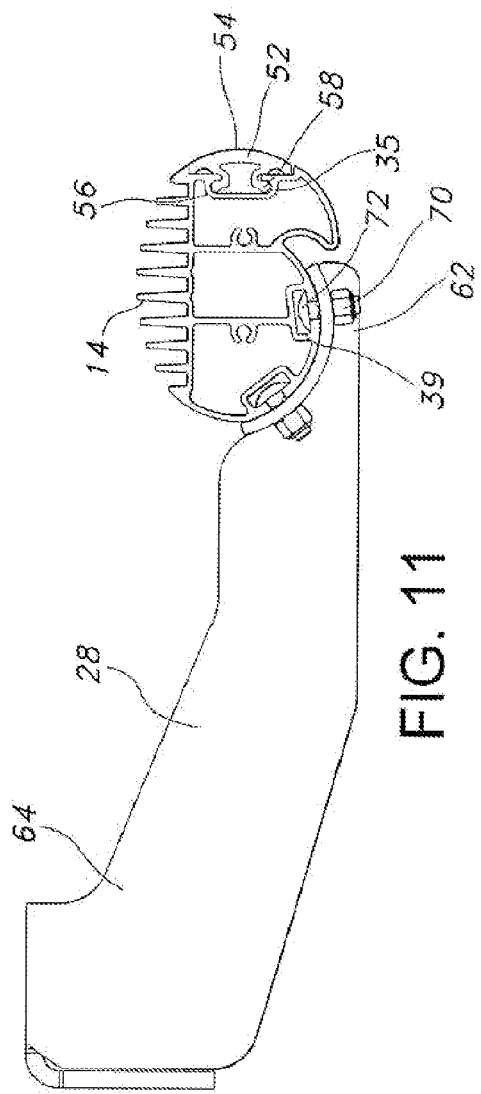

US 7,380,806 B2

VEHICLE STEP TUBE

BACKGROUND OF THE INVENTION

This application is a continuation of application Ser. No. 10/855,265 filed May 27, 2004 by Mulder entitled "Vehicle Step Tube" (now U.S. Pat. No. 7,168,721).

The present invention relates to step tubes for vehicles and to a method for making step tubes.

Step tubes, which are substitutes for running boards, are commonly mounted on vehicles for assisting a user of the vehicle to climb into and out of the vehicle. They are also commonly used for aesthetic reasons, and to. protect the side of the vehicle.

Step tubes can be fabricated from aluminum extrusions. An example of such a step tube is disclosed in U.S. Pat. No. 6,588,782 to Coomber. The Coomber step tube includes an elongated support portion 100, multiple cap portions 200, a step pad 300, and a mounting bracket 400. The cap portions 200 and the step portion 300 attach to the support portion 100 to form an upper surface of the assembly that is aesthetically pleasing and functional for assisting vehicle users. The step portion 300 may include a name plate 962, a plurality of perforations 964 to allow passage of light through the step pad 300, and a plurality of ridges 972 to provide traction for users stepping on the step portion 300.

The Coomber step tube requires a considerable fabrication and assembly of multiple extruded components. Consequently, manufacture of the Coomber step tube requires significant labor and therefore expense.

SUMMARY OF THE INVENTION

The aforementioned problems are overcome by the present invention, wherein a step tube comprises a one-piece extrusion that includes a plurality of generally vertical ribs on its upper portion. The ribs vary in height along their longitudinal extent, with the ribs being relatively short in one or more step portions and relatively high in the non-step portions flanking the step portion. The ribs provide traction in the step portion.

In one embodiment, transition portions extend between the step portion and the non-step portions. The height of the ribs gradually transitions from the high height in the non-step portions to the short height in the step portion.

In another embodiment, the ribs in the step portion include transverse cuts to further enhance traction and aesthetics in the step portion. The cuts may be located at spaced intervals throughout the step portion.

The present invention also includes a method of manufacturing a step tube, comprising the steps of a) extruding an elongated beam having a plurality of vertically extending ribs and b) removing a portion of the ribs in a step portion of the beam to define a step platform. The removing step may be performed by a computer operated machine.

The step tube of the present invention has a simplified unitary construction. The step tube can be manufactured more simply and with lower cost than prior step tubes. Therefore, the step tube provides advantages in manufacture and aesthetics without forfeiting function or structure.

These and other objects, advantages, and features of the invention will be more fully understood and appreciated by reference to the description of the current embodiments and the drawings.

BRIEF DESCRIPTION OF THE DRAWINGS

FIG. 11 is a cross sectional view of the step tube attached to a bracket.

FIG. 12 is a bottom view of a mounting bracket attached to the extrusion.

DESCRIPTION OF THE CURRENT EMBODIMENTS

Figure 1:
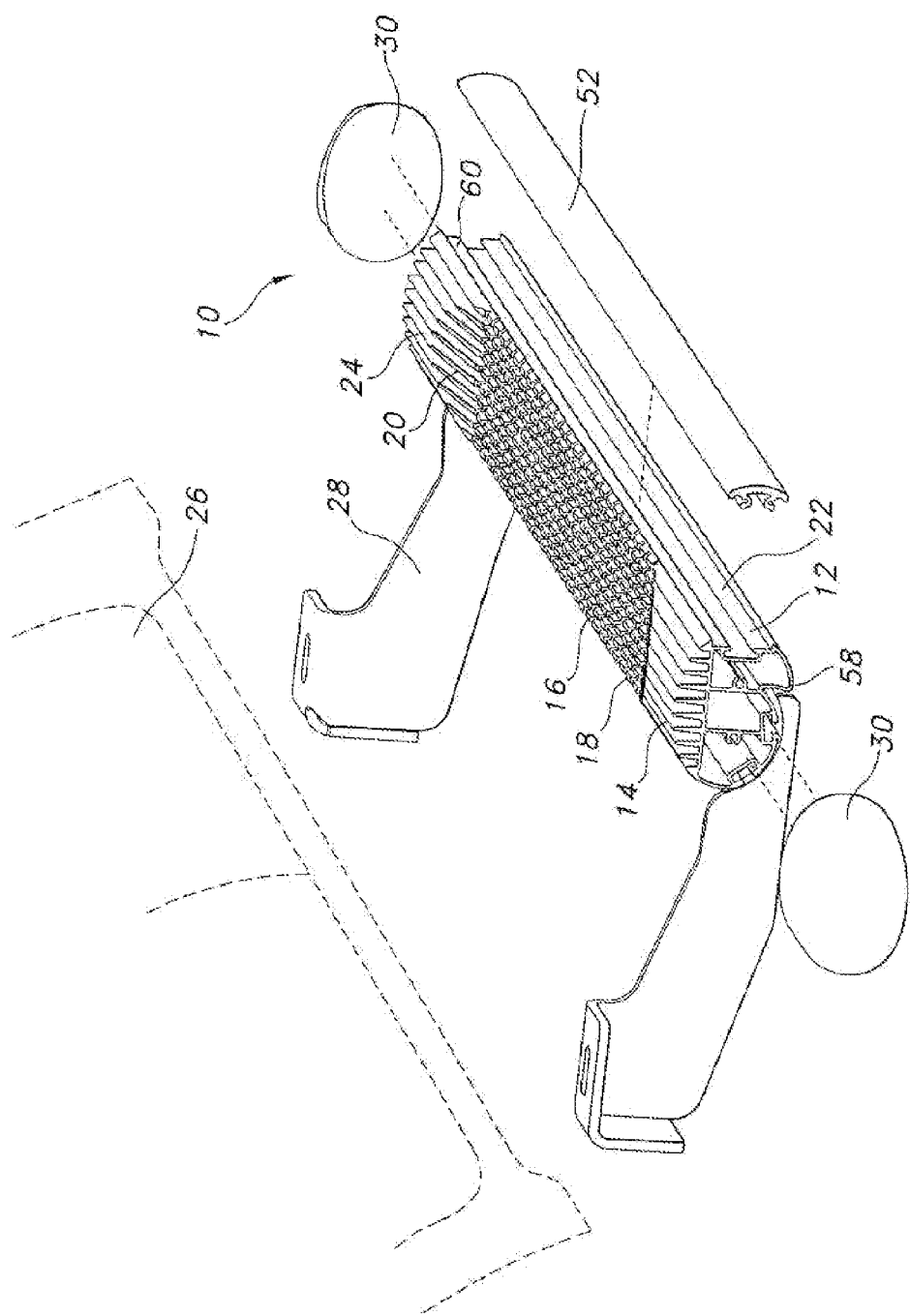
FIG. 1 is an exploded view of the step tube and a vehicle body.
Figure 2:
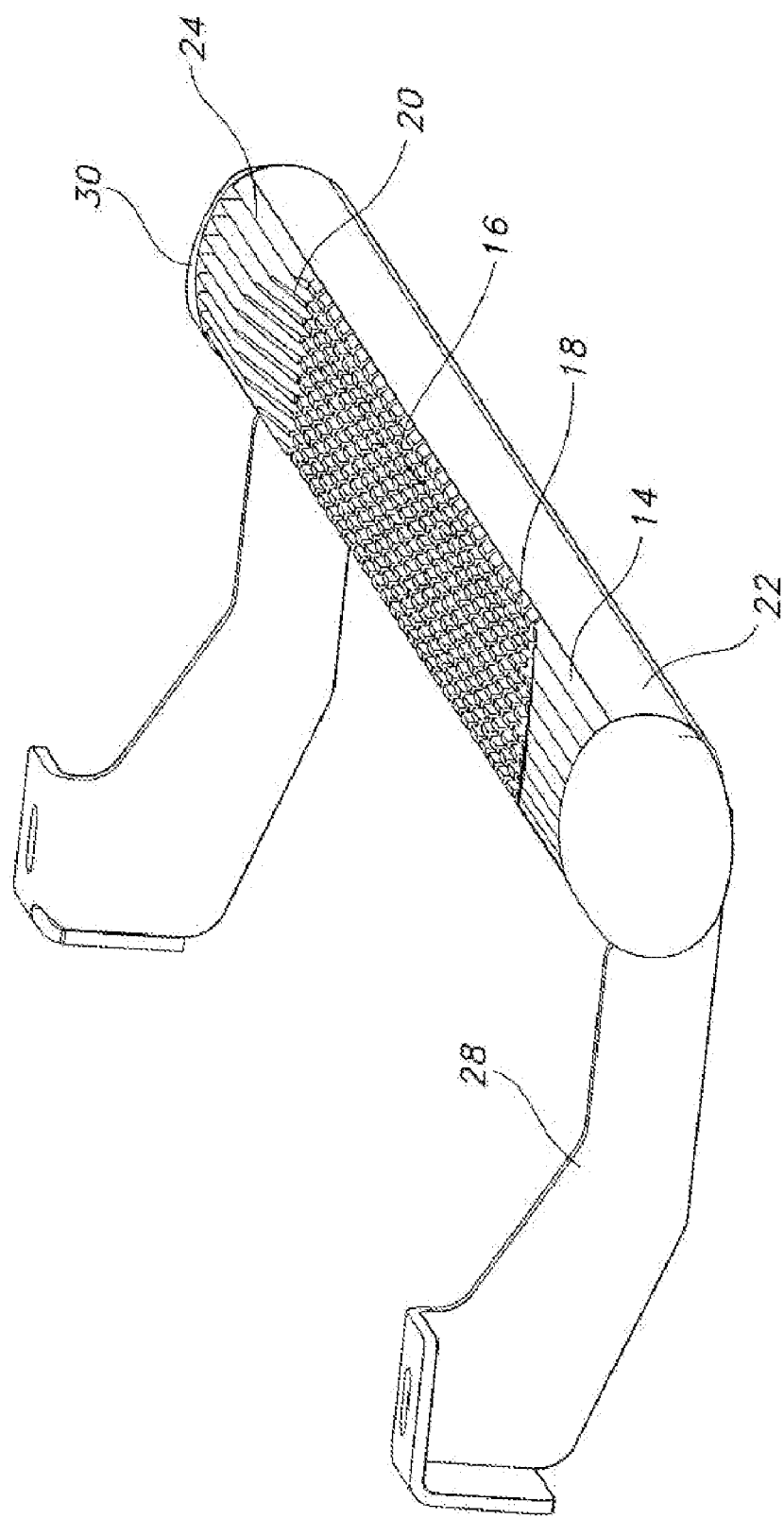
FIG. 2 is a perspective view of the step tube.

A step tube constructed in accordance with a preferred embodiment of the present invention is shown in FIGS. 1 and 2 and generally designated 10. The step tube 10 generally includes an elongated extrusion 12, having a plurality of generally vertical ribs 14. The extrusion further includes a step portion 16, transition portions 18, 20 flanking the step portion 16, and non-step portions 22, 24. The step tube is attached to a vehicle 26 with a plurality of mounting brackets 28, and may include a pair of end caps 30.

Figure 3:
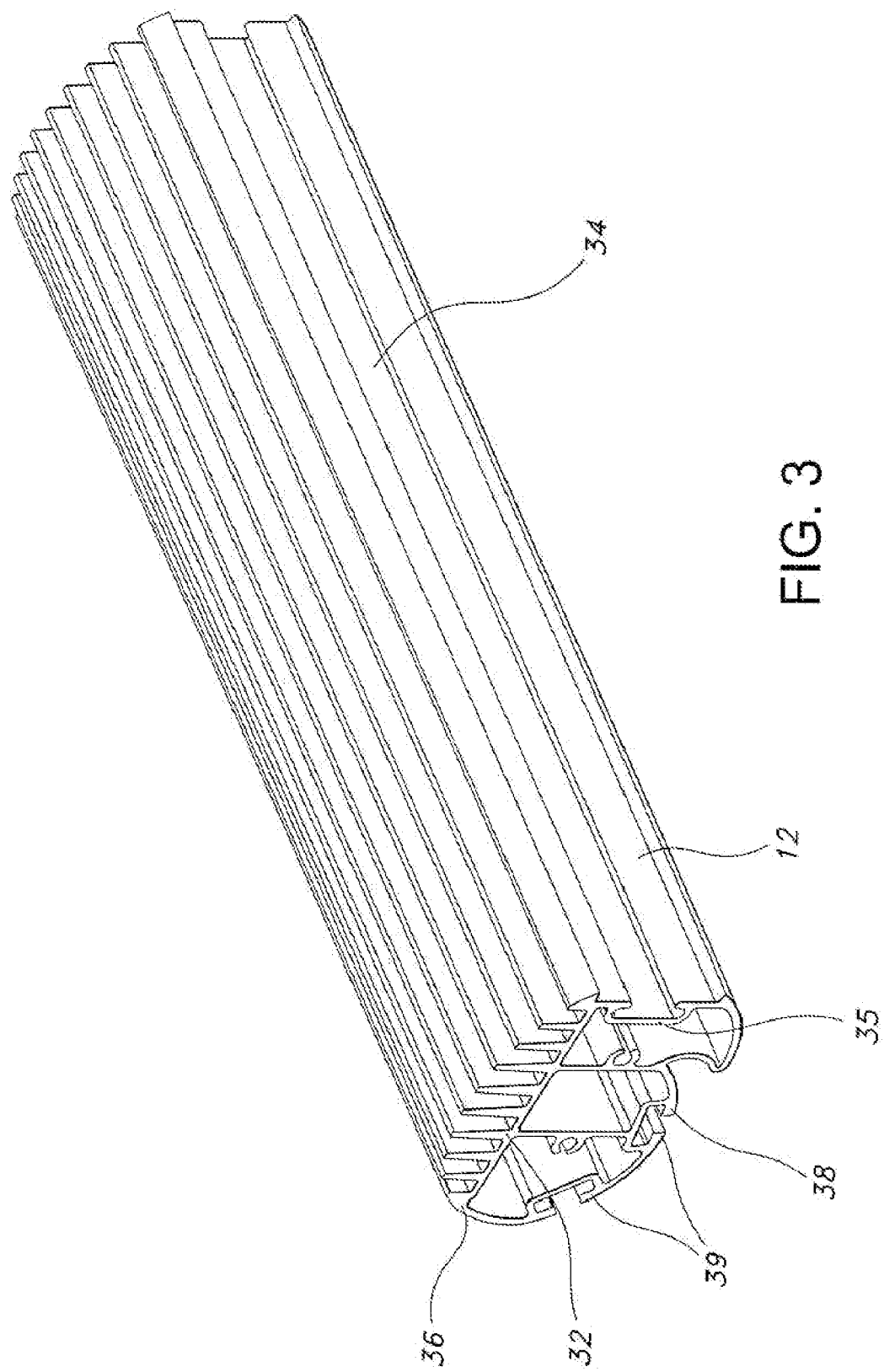
FIG. 3 is a perspective view of the step tube extrusion at section II in FIG. 1.

As shown in FIG. 3, the extrusion 12 is an elongated beam. The extrusion may be comprised of aluminum, a similar alloy, a thermoplastic, or any other suitable material. As the beam 12 is extruded, it is cut to a desired length, depending on the vehicle that it will be attached to. As shown in FIGS. 1 and 2, the beam 12 includes a step portion 16, transition portions 18, 20 on either side of the step portion 16, and opposing non-step portions 22, 24 adjacent to the transition portions 18, 20. Referring to FIG. 3, the beam 12 further includes an upper surface 32, a front surface 34, a rear surface 36, and a lower surface 38. The front surface 34 preferably includes a C-shaped slot 35 for receiving a trim piece 52 (shown in FIG. 11). The lower 38 and rear 36 surfaces preferably each include a T-shaped slot 39 for receiving attachment brackets 28.

Figure 4:
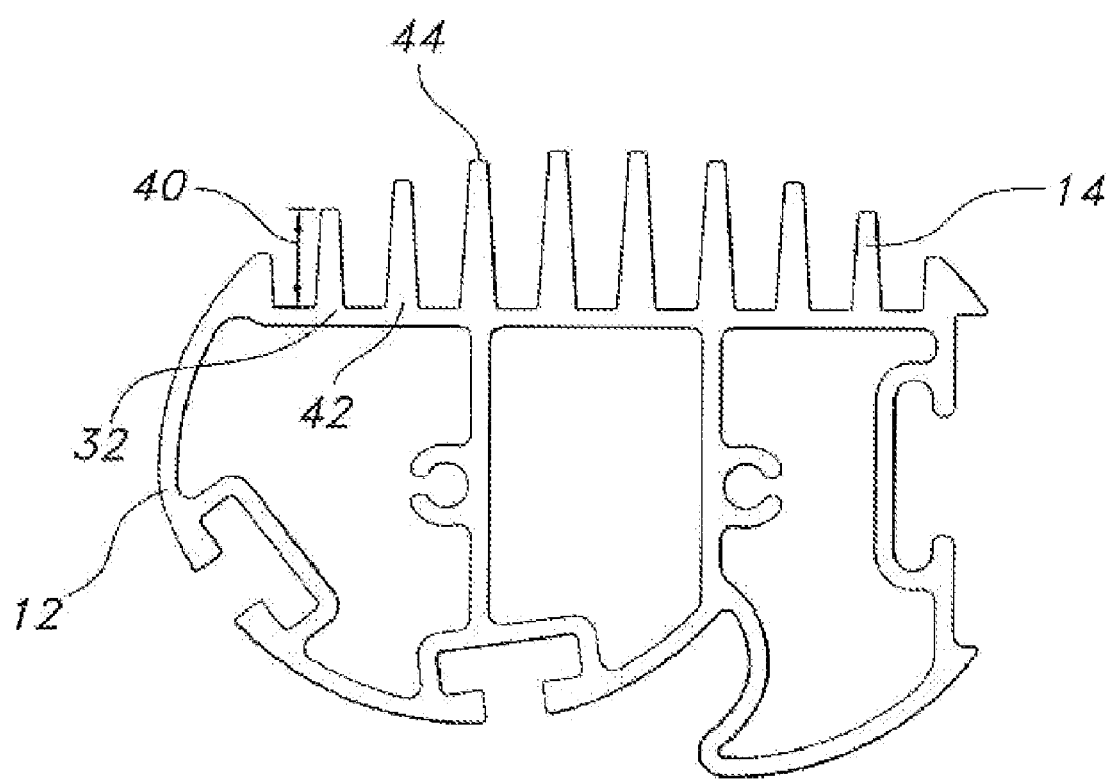
FIG. 4 is an end view of the extrusion of FIG. 2.

Referring now to FIG. 4, the plurality of ribs 14 extend vertically from the upper surface 32 of the extrusion 12. The ribs 14 are preferably spaced apart, and each rib has a height 40, a base 42, and an outer edge 44. As shown, the height 40 of the ribs 14 decreases in each sequential rib 14 as the ribs 14 approach the front and rear surfaces 34, 36. Alternatively, the ribs 14 may have a uniform height 40.

Figure 5:
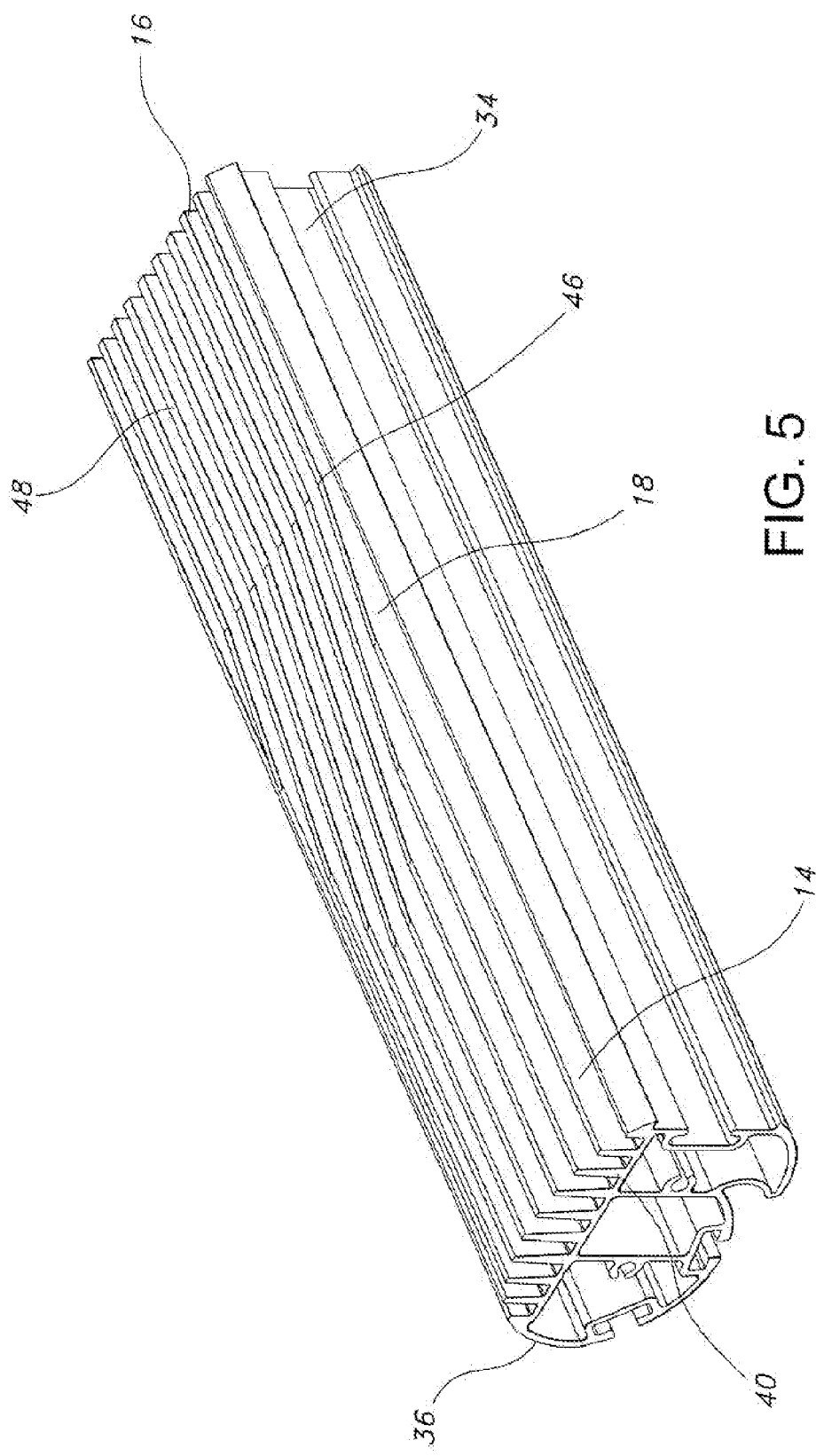
FIG. 5 is a perspective view of the extrusion at section II in FIG. 1, including a first cut.
Figure 5A:
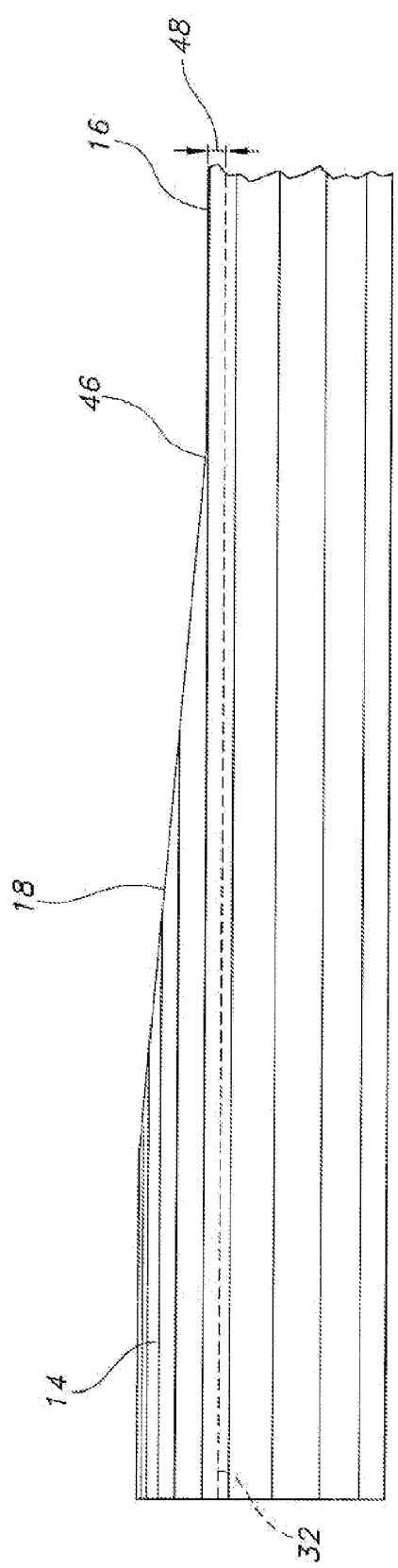
FIG. 5A is a side view of the extrusion of FIG. 5.

As shown in FIGS. 5 and 5A, the ribs 14 include a first cut 46 defining the step portion 16. In the illustrated embodiment, the step portion 16 is located in a central section of the extrusion 12 (see FIGS. 1 and 2). The first cut 46 is a cut that shaves off a portion of the height 40 of the ribs 14 such that the ribs 14 have a second height 48 in the step portion 16. In one embodiment, the first 46 is a machined cut. The second height 48 is preferably uniform from the front surface 34 to the rear surface 36 to form a level step platform. In one embodiment, the height 40 of the ribs 14 gradually tapers to the second height 48 within the transition portions 18, 20. Alternatively, the transition portions 18, 20 may have a variety of desired shapes.

Figure 6:
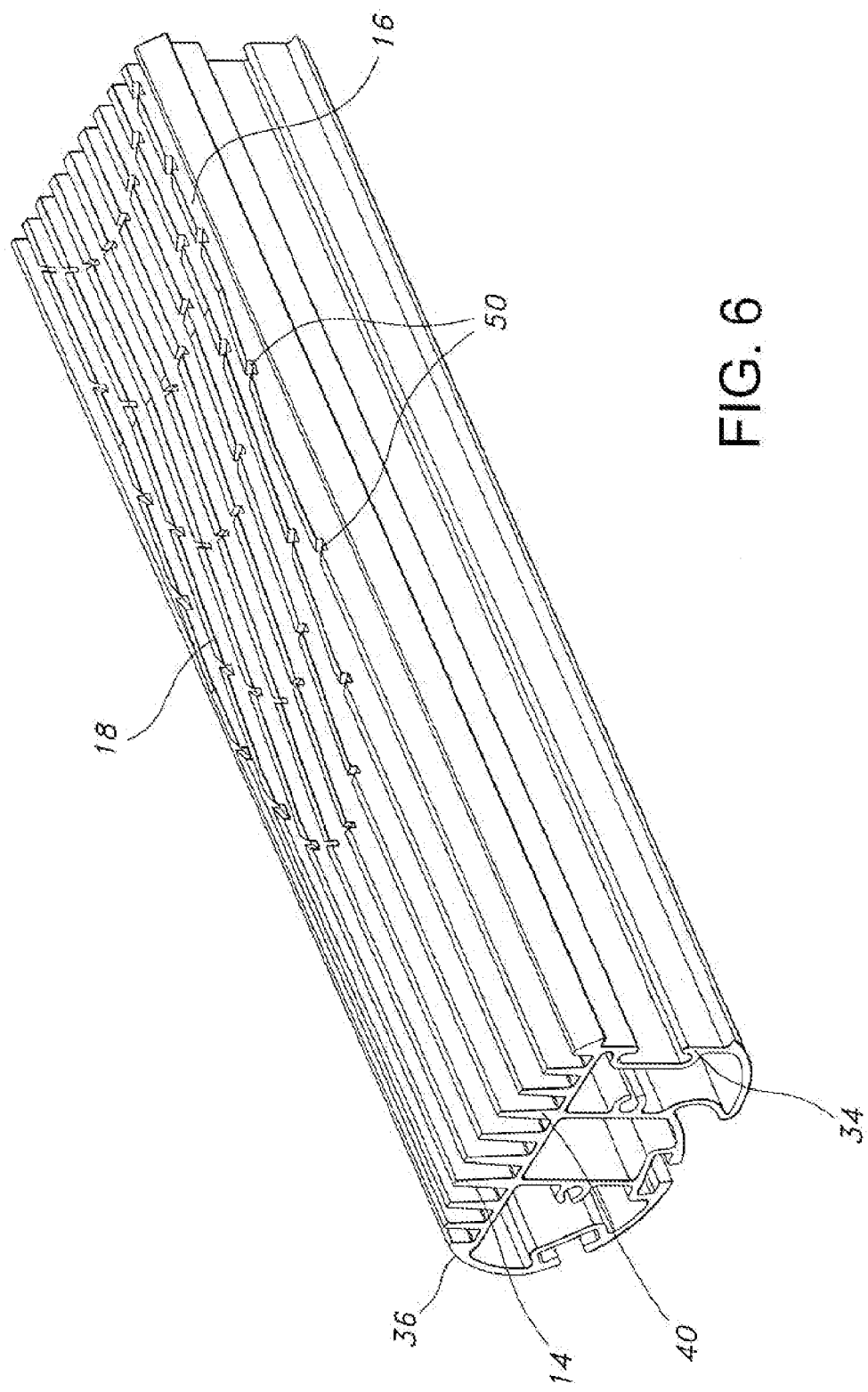
FIG. 6 is a perspective view of the extrusion of FIG. 5, also including a second cut.
Figure 6A:
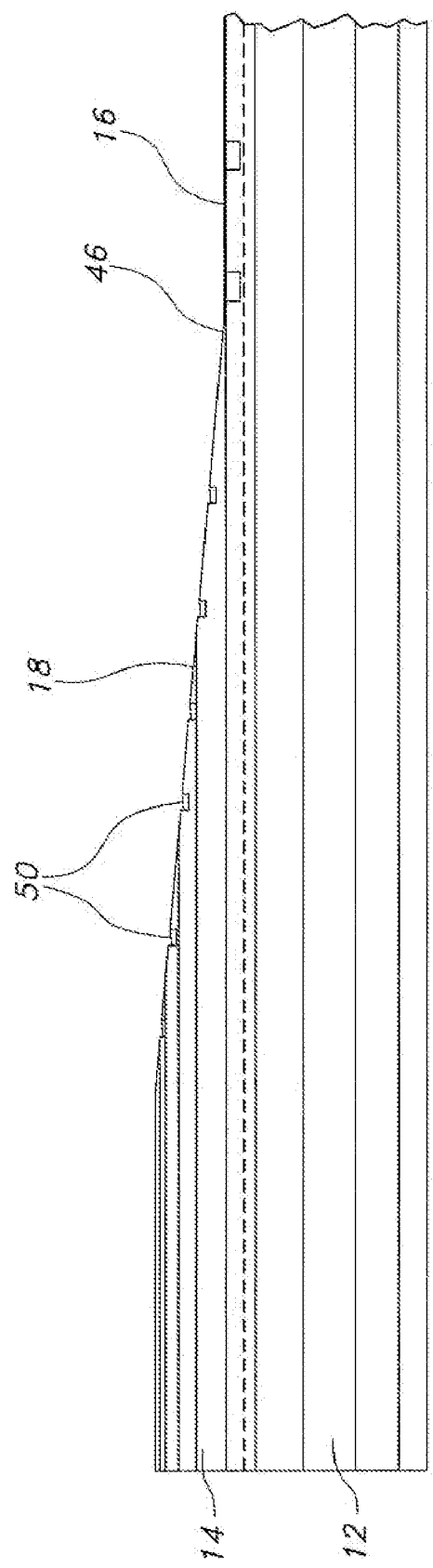
FIG. 6A is a side view of the extrusion of FIG. 6.
Figure 7:
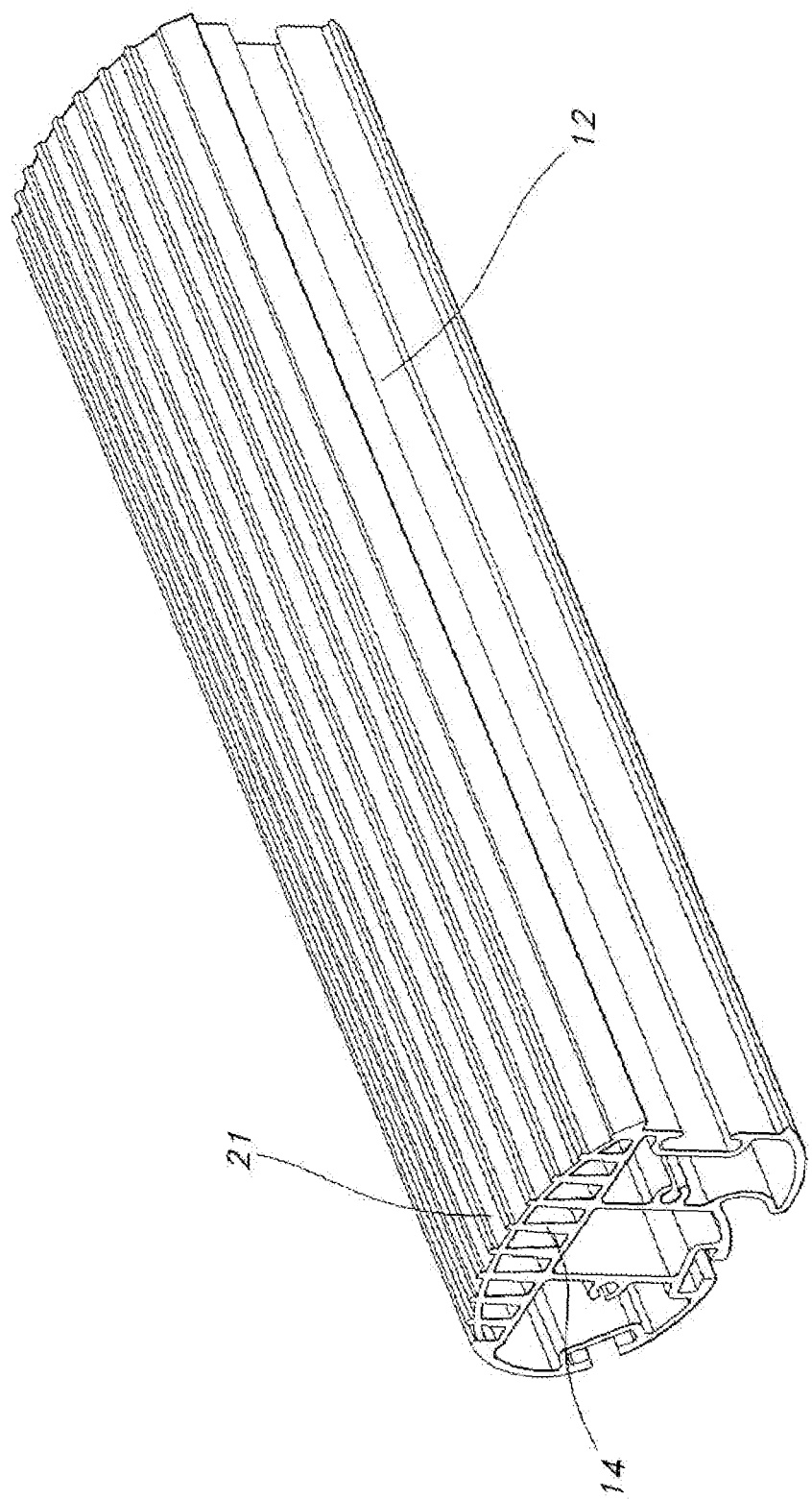
FIG. 7 is a perspective view of a second embodiment of the extrusion at section II of FIG. 1.

As shown in FIGS. 6 and 6A, the ribs 14 also may include a second cut or plurality of cuts 50. The second cuts 50 preferably extend transversely through the ribs 14 across the extrusion from the front surface 34 to the rear surface 36. The second cuts 50 are preferably spaced apart in a series of cuts throughout the step portion 16 and the transition portions 18, 20. As shown in FIG. 6, the series of second cuts 50 have a parabolic shape as they extend transversely across the extrusion 12. Alternatively, the second cuts 50 may have a variety of desired shapes and patterns. They may be straight cuts that are perpendicular to the first cuts, and they may even have the formation of a logo.

Referring to FIGS. 1 and 11, the step tube may include a trim piece 52 and a pair of end caps 30. The trim piece 52 is a separate decorative part that may also be extruded from aluminum, a similar alloy, a thermoplastic, or other suitable material. It also acts as a bumper to protect the step tube 10. The trim piece 52 has a front surface 54 that is shaped to correspond with the shape of the front surface 34 of the extrusion 12, and a rear surface 56 that includes a T-shaped protrusion 58 that may be slidably coupled with the C-shaped slot 35. The end caps 30 are adapted to engage the open ends 58, 60 of the extrusion, and are shaped to close off the ends. The end caps 30 may include a plurality of vertically extending extrusions to correspond with the ribs 14.

The step tube 10 may be attached to a vehicle body by a variety of conventional methods. FIG. 11 shows one such method, wherein at least one mounting bracket 28 is attached at a first end 62 to the step tube 10 and at a second end 64 to a vehicle body 26. The first end 62 attaches to the T-shaped slots 39, with a nut 70 and bolt 72, or with a T-shaped protrusion (not shown) that may be slidably engaged with the slots 39. The second end 64 preferably attaches to the vehicle 26 through slot 66 with a nut and bolt (not shown).

Figure 8:
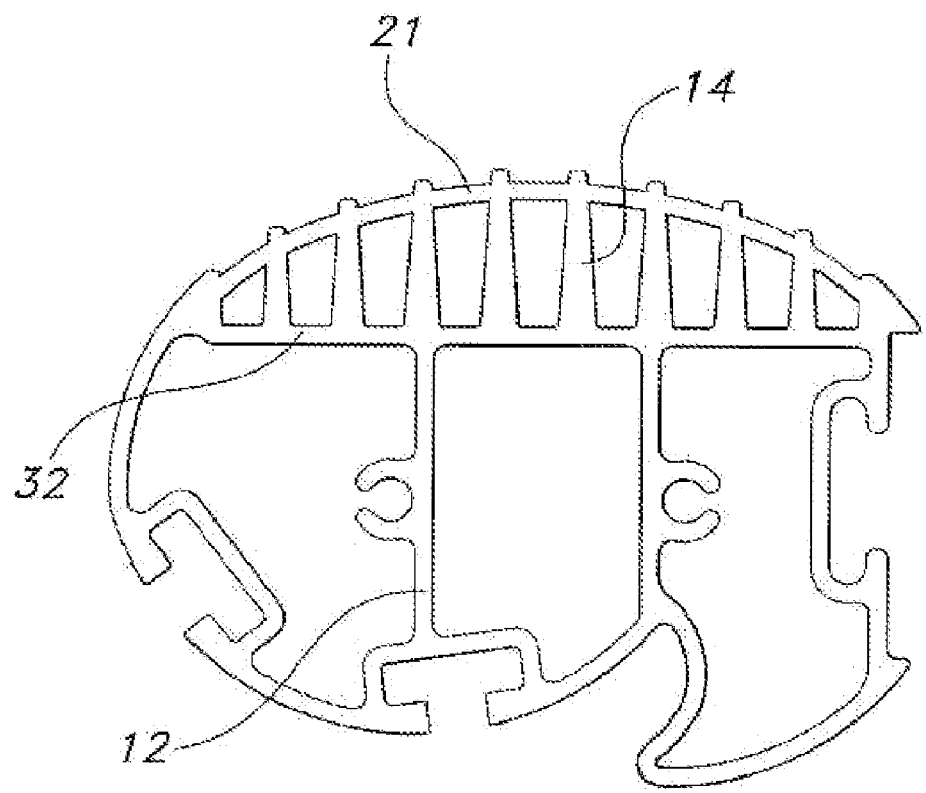
FIG. 8 is an end view of the extrusion of FIG. 7.
Figure 9:
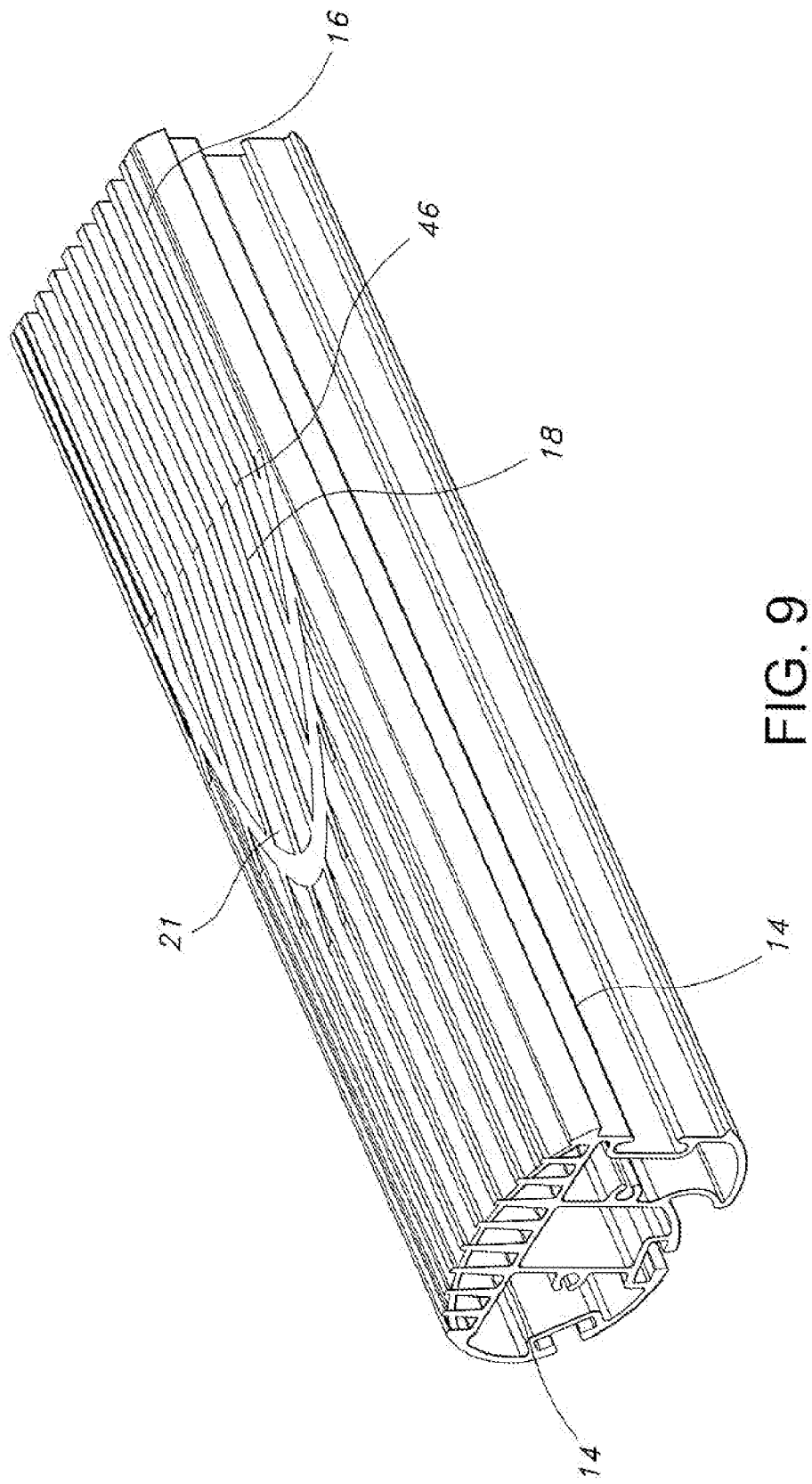
FIG. 9 is a perspective view of the second embodiment of the extrusion at section II in FIG. 1, including a first cut.
Figure 9A:
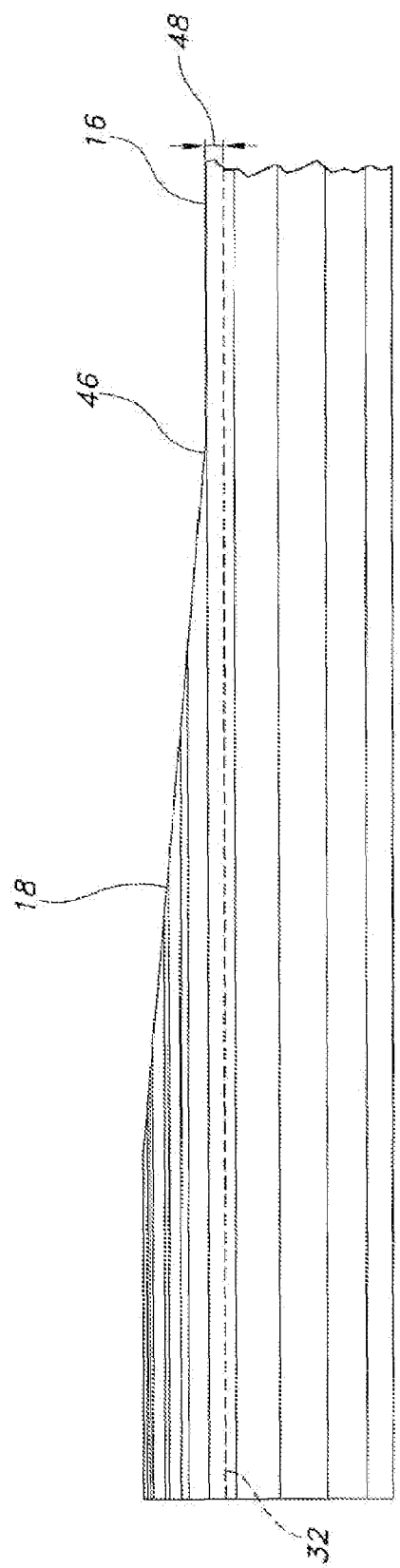
FIG. 9A is a side view of the extrusion of FIG. 9.
Figure 10:
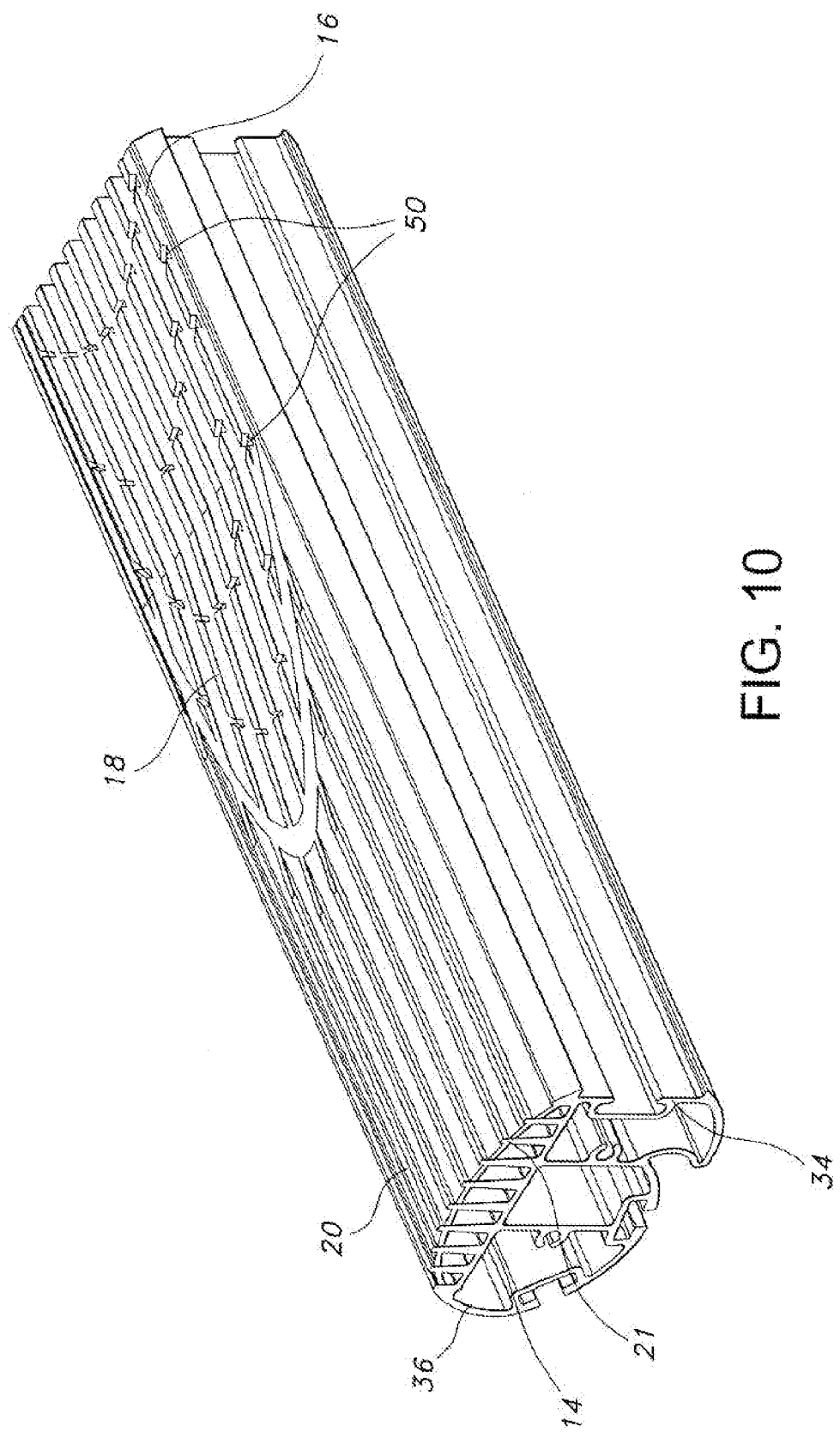
FIG. 10 is a perspective view of the extrusion of FIG. 9, also including a second cut.
Figure 10A:
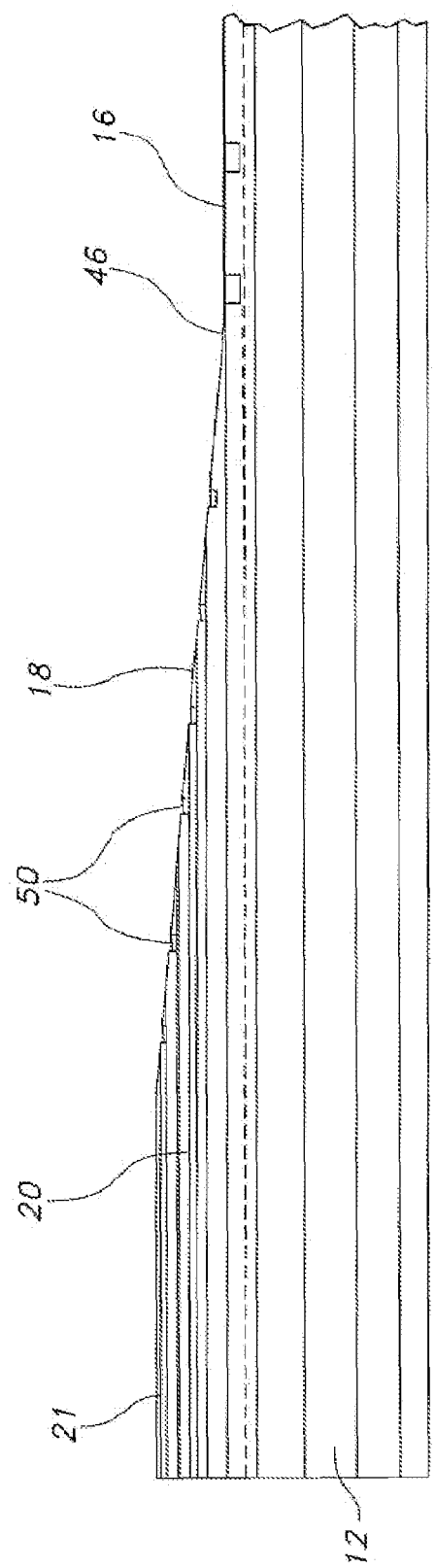
FIG. 10A is a side view of the extrusion of FIG. 10.

FIGS. 7-10 show a second embodiment of the present invention, wherein the extrusion 12 includes a web 21 that attaches between the outer edges 44 of the ribs 14, and encloses the ribs 14. As shown in FIG. 8, the profile of the extrusion 12 is the same as the first embodiment, but further including the web 21. FIGS. 9 and 9A show the extrusion 12 with the web 21, further including a first cut 46. The cut 46 is identical to the first cut 46 of the first embodiment, however, in this embodiment, the first cut 46 removes a portion of the web 21 along with portions of the ribs 14. The transition portions 18, 20 and the step portion 16 are the same as in the first embodiment. FIG. 10 additionally shows the second cut 15 as a series of cuts identical to those of the first embodiment. The end portions 22, 24 continue to include the web 21 after the cuts 46, 50 have been made.

Figure 13:
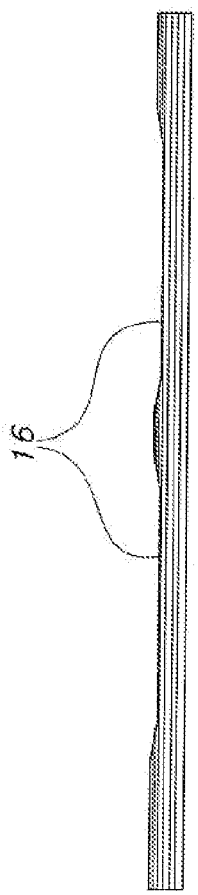
FIG. 13 is a side view of an alternative embodiment.
Figure 14:
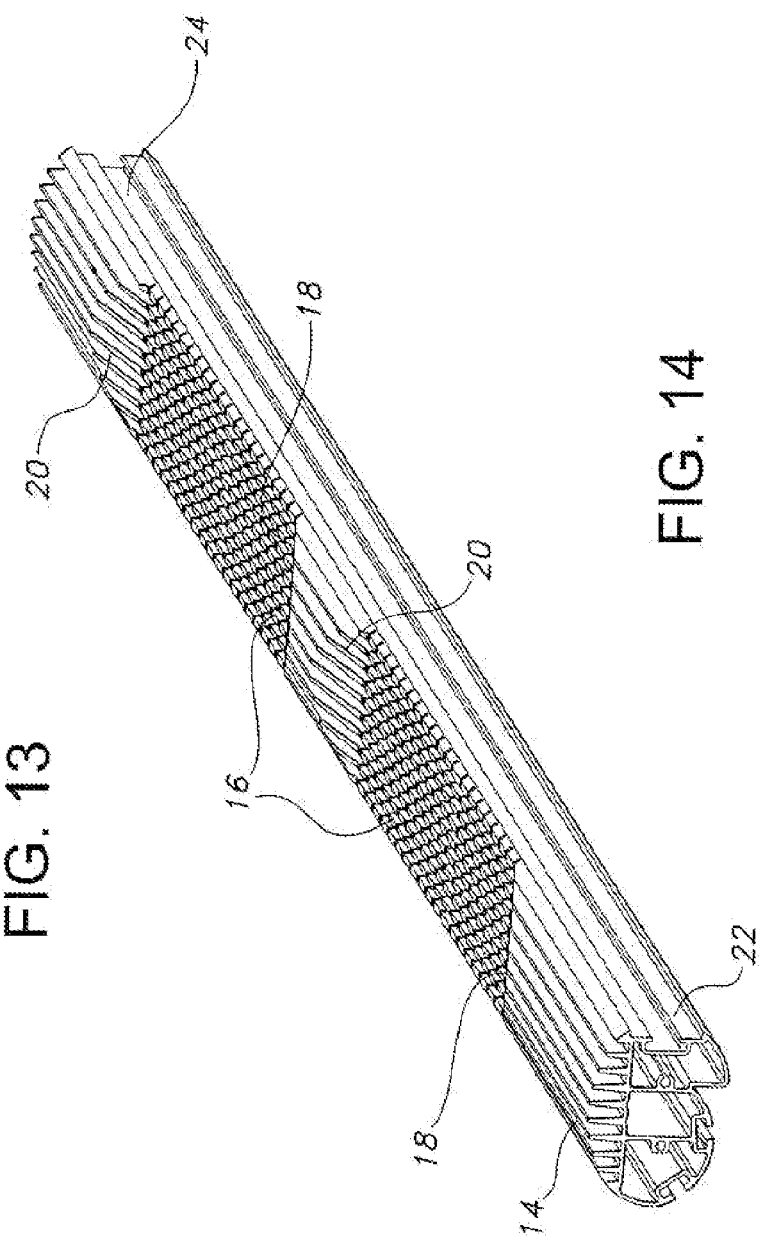
FIG. 14 is a perspective view of the alternative embodiment of FIG. 13.

Another embodiment of the invention is shown in FIGS. 13 and 14. In this embodiment, the step tube includes a plurality of step portions 16. As shown in FIGS. 13 and 14, there are two step portions 16. The step portions 16 generally include first and second cuts similar to that disclose above. As shown, the second cuts 50 are perpendicular to the first cuts 46. The cuts of each step portion 16 may vary in height and design. In general, the multiple step portions coincide in location with front and rear doors of the vehicle and possibly a cargo bed. Of course, this embodiment may also include the web 21 of the second disclosed embodiment.

Manufacture of the present invention requires the steps of a) extruding an elongated beam having a plurality of vertically extending ribs; b) cutting down the height of the ribs in a step portion of the beam to define a step platform; and c) attaching the beam to a vehicle body. The beam may be extruded such that it has the profile shown in FIG. 4, or alternatively the profile of FIG. 8. Step b) preferably includes the first cut 46, followed by the second cut(s) 50. The first and second cuts may be machined cuts that are performed in an automated process. Step c) may include attaching the beam to a vehicle with the mounting brackets 28, as shown in FIGS. 1 and 11. The brackets are attached at a first end 62 to the beam, and at a second end 64 to the vehicle body 26. The trim piece 52 can be slidably engaged in the slot 35.

The above descriptions are those of current embodiments of the invention. Various alterations and changes can be made without departing from the spirit and broader aspects of the invention, which are to be interpreted in accordance with the principles of patent law including the Doctrine of Equivalents.

The embodiments of the invention in which an exclusive property or privilege is claimed are defined as follows:

1. A vehicle step tube comprising:
  a one-piece elongated extrusion having a longitudinal length, an outer surface, a top portion defining a step area, a bottom portion, and a side portion below said step area and above said bottom portion, said side portion defining a longitudinal slot opening through said outer surface and located between said top portion and said bottom portion; and
  a trim piece fitted within said slot and located below said step area and above said bottom portion, said trim piece being for at least one of decorating and protecting said extrusion.

2. A vehicle step tube comprising:
  a one-piece elongated extrusion having a longitudinal length, said extrusion including an upper surface and a plurality of ribs extending from said upper surface along said length of said extrusion, said extrusion including a step portion and a pair of non-step portions flanking said step portion, said ribs being relatively short in said step portion and relatively tall in said non-step portions, said extrusion defining a longitudinal slot in said outer surface; and
  a trim piece fitted within said slot, said trim piece being for at least one of decorating and protecting said extrusion.

3. A vehicle step tube comprising:
  an elongated step tube body having a top portion defining a step area, a bottom portion, and a side portion below said top portion and above said bottom portion, said step tube body comprising an extrusion including a longitudinal length and an outer surface, said extrusion defining a slot opening through said outer surface and located below said top portion and above said bottom portion; and a trim piece supported by said side portion, said trim piece located below said top portion and above said bottom portion, said trim piece being received within said slot.

4. A vehicle step tube comprising:

an elongated step tube body, said body including an upper surface, a step portion, and opposing non-step portions, said body including a plurality of substantially vertical ribs extending from said upper surface along said longitudinal length, said ribs defining a first height in said non-step portions and a second height in said step portion, said second height being shorter than said first height; and a trim piece supported by said step tube body.

5. The vehicle step tube of claim 4 wherein said ribs further define a plurality of transverse recesses within said step portion.

* * * * *